United States Patent
Hassan et al.

(10) Patent No.: US 10,673,920 B2
(45) Date of Patent: *Jun. 2, 2020

(54) HOST SELECTION FOR A MEDIA FLOW

(71) Applicant: Microsoft Technology Licensing, LLC, Redmond, WA (US)

(72) Inventors: Amer Aref Hassan, Kirkland, WA (US); Sonu Arora, Redmond, WA (US); Omar Aftab, Kirkland, WA (US); Bradford R. Clark, Broomfield, CO (US); Danny Levin, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/058,609

(22) Filed: Aug. 8, 2018

(65) Prior Publication Data

US 2019/0141109 A1 May 9, 2019

Related U.S. Application Data

(63) Continuation of application No. 15/057,928, filed on Mar. 1, 2016, now Pat. No. 10,075,499.

(51) Int. Cl.
*H04L 12/18* (2006.01)
*H04L 29/06* (2006.01)
*H04L 29/08* (2006.01)

(52) U.S. Cl.
CPC .......... *H04L 65/80* (2013.01); *H04L 12/1827* (2013.01); *H04L 65/403* (2013.01);
(Continued)

(58) Field of Classification Search
CPC ... H04L 65/80; H04L 65/403; H04L 12/1827; H04L 12/1822; H04L 12/1818; H04L 67/1051; H04L 12/66; H04L 29/06; H04L 41/5032; H04L 67/02; H04L 67/1095; G06F 17/289; H04N 7/141; H04N 7/148; H04W 4/001
See application file for complete search history.

(56) References Cited

U.S. PATENT DOCUMENTS

2011/0279636 A1* 11/2011 Periyannan ............ H04N 7/141
348/14.09
2012/0117153 A1* 5/2012 Gunasekar ............ G06F 17/289
709/204
(Continued)

*Primary Examiner* — Le H Luu
(74) *Attorney, Agent, or Firm* — Schwegman Lundberg & Woessner, P.A.

(57) ABSTRACT

Disclosed are methods and systems for selecting a host facility for a communications session for a group of devices. In one aspect, a method includes partitioning the devices into multiple clusters. Each cluster is associated with a respective host facility that is estimated to provide each device in the respective cluster a specified quality requirement during the communication session. The method also includes accessing a weighting value for each cluster of the different clusters based on one or more attributes of the devices in each respective cluster of the different clusters, and selecting a group host facility, from the host facilities associated with the clusters based on the weighting value of each respective cluster and a predefined criterion, the group host facility to host the communication session for the devices.

20 Claims, 9 Drawing Sheets

(52) U.S. Cl.
CPC ...... *H04L 67/1051* (2013.01); *H04L 12/1818* (2013.01); *H04L 12/1822* (2013.01)

(56) References Cited

U.S. PATENT DOCUMENTS

| | | | | |
|---|---|---|---|---|
| 2012/0246212 A1* | 9/2012 | Ahmad | ............... | H04L 65/4046 |
| | | | | 709/201 |
| 2014/0189110 A1* | 7/2014 | Chakra | ............... | H04L 67/1095 |
| | | | | 709/224 |
| 2014/0280595 A1* | 9/2014 | Mani | ................... | H04L 12/1827 |
| | | | | 709/204 |
| 2015/0002614 A1* | 1/2015 | Zino | ...................... | H04N 7/148 |
| | | | | 348/14.08 |
| 2015/0040220 A1* | 2/2015 | Mantripragada | ....... | H04L 12/66 |
| | | | | 726/22 |
| 2016/0088028 A1* | 3/2016 | Fahlgren | ................. | H04L 67/02 |
| | | | | 709/204 |
| 2016/0094596 A1* | 3/2016 | Goepp | ................ | H04L 12/1818 |
| | | | | 709/204 |
| 2016/0149985 A1* | 5/2016 | Meloche | ............ | H04L 41/5032 |
| | | | | 370/329 |
| 2016/0156686 A1* | 6/2016 | Jennings | ................. | H04L 29/06 |
| | | | | 709/219 |
| 2016/0156691 A1* | 6/2016 | Leeb | ....................... | H04L 65/80 |
| | | | | 709/225 |

* cited by examiner

HOST SELECTION FOR A MEDIA FLOW

RELATED APPLICATION

This application is a continuation of and claims priority to U.S. patent application Ser. No. 15/057,928, filed on 1 Mar. 2016 and titled "Host Facility Assignment for a Conferencing Session," the disclosure of which is incorporated in its entirety by reference herein.

BACKGROUND

Modern communication systems have an array of capabilities, including integration of various communication modalities with different services. For example, voice/video communications, instant messaging, data/application sharing, white-boarding, and other forms of communication may be combined with presence and availability information for users. Such systems enable users to engage in communication sessions to exchange different types of communication media, such as voice data, video data, content sharing, and combinations thereof. Furthermore, collaboration systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, a UC system typically utilizes multiple interconnected networks to route various communications. Since different networks may be managed by different entities, challenges thus arise in maintaining communications quality for communications that are routed among independently managed networks. Further, UC is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for host facility selection for a communication session between devices are described. In one aspect, a system includes hardware processing circuitry and one or more electronic memories storing instructions. When executed, the instructions configure the hardware processing circuitry to perform operations for selecting a host facility for a communication session between a group of devices. The operations include partitioning the devices into multiple clusters, wherein each cluster is associated with a respective host facility that is estimated to provide each device in the respective cluster a specified quality requirement during the communication session, accessing a weighting value for each cluster of the different clusters based on one or more attributes of the devices in each respective cluster of the different clusters, and selecting a group host facility, from the host facilities associated with the clusters based on the weighting value of each respective cluster and a predefined criterion, the group host facility to host the communication session for the devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
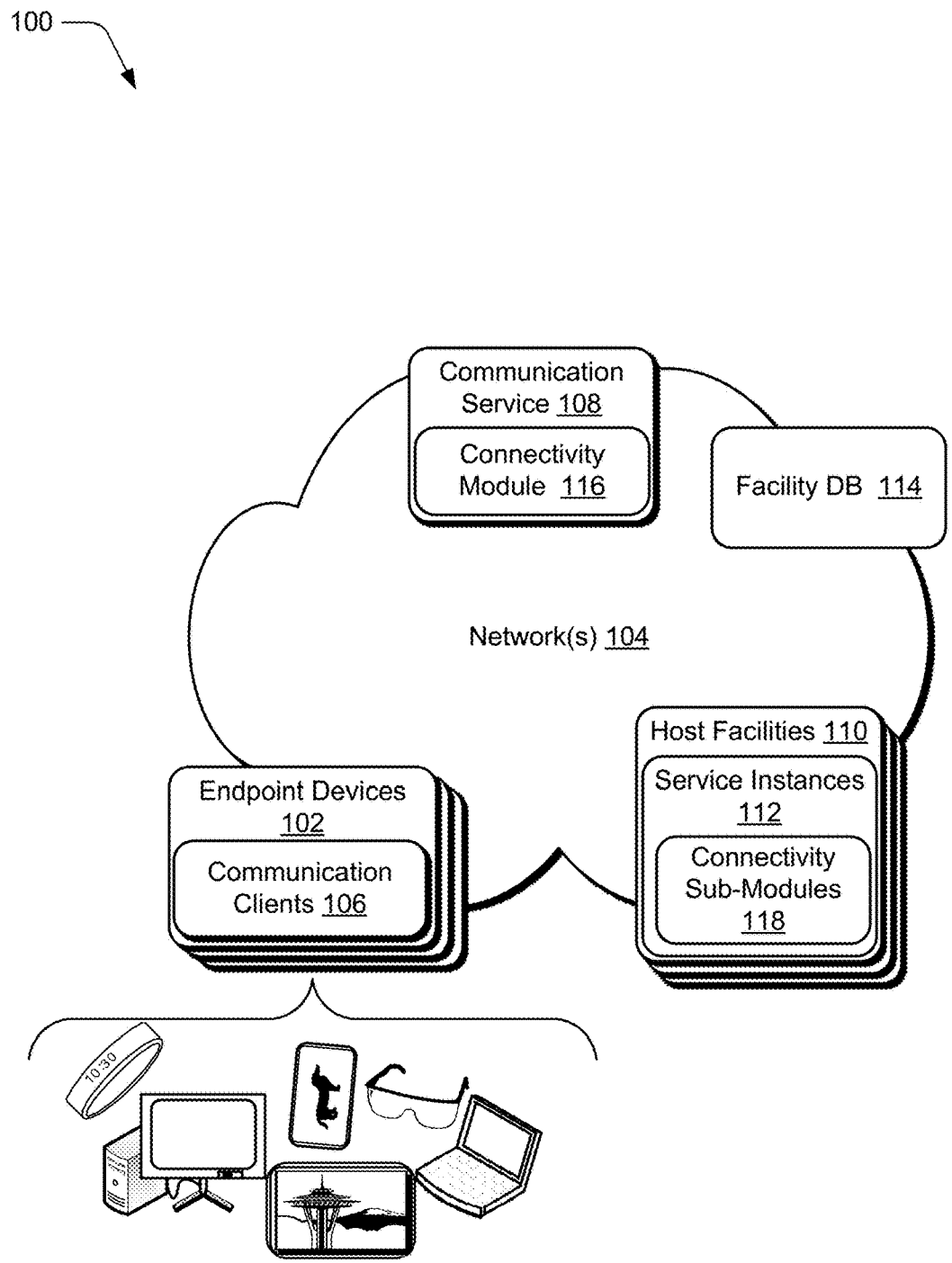
FIG. 1 is an illustration of an environment in an example implementation that is operable to employ techniques discussed herein.

Techniques for host selection for a media flow are described. According to various implementations, a conferencing session refers to an exchange of communication media between communication endpoints, such as part of a real-time communication session between users of different communication endpoints. Examples of a conferencing session include a Voice over Internet Protocol (VoIP) call, a video call, text messaging, a file transfer, and/or combinations thereof. In at least some implementations, a conferencing session represents a Unified Communications (UC) session. Generally, a conferencing session typically involves multiple different users and different endpoint devices at different locations.

Accordingly to various implementations, multiple different host facilities are available for hosting a conferencing session. Each host facility, for instance, includes hardware and logic for performing various tasks for hosting of a conferencing session, such as media flow routing and rerouting, session diagnostics, session signal transcoding, and so forth. A host facility may be implemented as a data center that maintains hardware and connectivity for managing and routing conferencing sessions among different endpoint devices.

Further to techniques described herein, a host facility from the different available host facilities is selected to perform hosting duties for the conferencing session. For instance, the host facility is determined to be a quality center (e.g., a "quality centroid") that is estimated to best satisfy a quality-related policy for the conferencing session. A variety of different factors are considered in selected a host facility, such as attributes of different available host facilities, attributes of endpoint devices serviced by the host facilities, and so forth. In at least some implementations, a host facility that is estimated to provide a highest media quality (e.g., session quality) for the conferencing session is selected to host the conferencing session. Different ways of assigning and reassigning host facilities are presented in detail below.

Thus, implementations discussed herein enable session quality optimization for conferencing sessions to increase session quality and thus quality of user experience. Further, a host facility can be dynamically reassigned to account for various changes that occur during a conferencing session.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques host selection for a media flow described herein. Generally, the environment 100 includes various devices, services, and networks that enable communication via a variety of different modalities. For instance, the environment 100 includes endpoint devices 102 connected to a network 104. The endpoint devices 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth. Example implementations of the endpoint devices 102 are discussed as the computing device 1002 of the system 1000.

The network 104 is representative of a network that provides the endpoint devices 102 with connectivity to various networks and/or services, such as the Internet. The network 104 may provide the endpoint devices 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The endpoint devices 102 each include an instance of communication clients 106, which are representative of functionality to enable different forms of communication via the endpoint devices 102, such as for communication between the different endpoint devices 102. Examples of the communication clients 106 include a voice communication application (e.g., a VoIP client), a UC client, a video communication application, a messaging application, a content sharing application, and combinations thereof. The communication clients 106, for instance, enable different communication modalities to be combined to provide diverse communication scenarios. In at least some implementations, the communication clients 106 represent applications that are installed on the endpoint devices 102. Additionally or alternatively, the communication clients 106 can be implemented as portals to a remote application, such as accessed via a web browser, a web application, and so forth.

The environment 100 further includes a communication service 108, which is representative of a service to perform various tasks for management of communication between the endpoint devices 102. The communication service 108, for instance, can manage initiation, moderation, and termination of communication sessions. Examples of the communication service 108 include a VoIP service, an online conferencing service, a UC service, and so forth. The communication service 108, for instance, represents a conferencing service that enables collaborative conferencing sessions to be established between multiple of the endpoint devices 102. Generally, a conferencing session refers to a communication session that involves a conference call between multiple endpoint devices 102, e.g., three or more of the endpoint devices 102.

According to one or more implementations, the communication clients 106 are managed and/or hosted by the communication service 108. For instance, the communication clients 106 represent interfaces to communication services provided by the communication service 108.

The environment 100 further includes host facilities 110, which are representative of functionality for hosting conferencing sessions between the endpoint devices 102. The host facilities 110, for example, include hardware and logic for performing various tasks for hosting of a conferencing session, such as media flow routing and rerouting, session diagnostics, session signal transcoding, and so forth. At least some of the host facilities 110 are implemented as data centers that maintain hardware and connectivity for managing and routing conferencing sessions among the endpoint devices 102.

The host facilities 110 include service instances 112, which are representative of functionality that is deployed by the communication service 108 for hosting conferencing sessions among the endpoint devices 102. The service instances 112, for example, represent instances and/or agents of the communication service 108 that are each hosted on different respective instances of the host facilities 110.

The environment 100 further includes a host facility database (DB) 114, which stores various information about the host facilities 110. Examples of such information include locations (e.g., geographical and/or network-based) of the individual host facilities 110, performance attributes of host facilities 110, which endpoint devices 102 are serviced by which of the host facilities 110, and so forth. In at least some implementations, the facility DB 114 stores quality attributes for each of the host facilities 110, such as historic and/or current media quality experienced across the individual host facilities 110, signal bandwidth capacities, processing and/or storage capacities, and so forth.

The facility DB 114, for instance, indicates performance data for individual host facilities 110, such as indications of media flow quality across the individual host facilities 110. For example, individual of the host facilities 110 can be characterized in the facility DB 114 based on historical quality metrics, such as detected as part of historic conferencing sessions hosted by the individual host facilities 110. In at least some implementations, the facility DB 114 maintains active state awareness of the host facilities 110 based on session quality attributes that are detected as part of active conferencing sessions. Accordingly, data from the facility DB 114 can be provided to the communication service 108 and/or the host facilities 110 to enable various decisions to be made about which host facility 110 is to host a particular conferencing session.

According to various implementations, the facility DB 114 may be deployed and/or managed by the communication service 108 and/or one or more of the host facilities 110. Alternatively, the facility DB 114 may be implemented as a standalone entity that may be leveraged to provide information about the host facilities to the communication service 108 and the host facilities 110.

To enable management of conferencing session connectivity among the endpoint devices 102, the communication service 108 includes a connectivity module 116 and the service instances 112 includes connectivity sub-modules 118. Generally, different aspects of techniques for host selection for a media flow described herein may be performed by the connectivity module 116, particular instances of the connectivity sub-modules 118, and/or interaction between the connectivity module 116 and the connectivity sub-modules 118.

According to various implementations, techniques for host selection for a media flow described herein are leveraged to select a particular host facility 110 to host a particular conferencing session based on different considerations, such as a number of participants in the conferencing session, location of the participants, quality and/or capacity of the individual host facilities 110, and so forth. Further, selection of a particular host facility 110 to host a conferencing session may be performed by the connectivity module 116, by one or more of the connectivity sub-modules 118, or via interaction between the connectivity module 116 and one or more of the connectivity sub-modules 118. Further details and interactions of the environment 100 for implementing techniques for host selection for a media flow are described below.

The various entities and functionalities discussed in the environment 100 may be implemented in software, hardware, firmware, and/or combinations thereof.

Having described an example environment in which the techniques described herein may operate, consider now some example implementation scenarios for host selection for a media flow in accordance with one or more implementations.

Example Implementation Scenarios

The following section describes example implementation scenarios for host selection for a media flow in accordance with one or more embodiments. The implementation scenarios may be implemented in the environment 100 discussed above, the system 1000 described below, and/or any other suitable environment.

Figure 2:
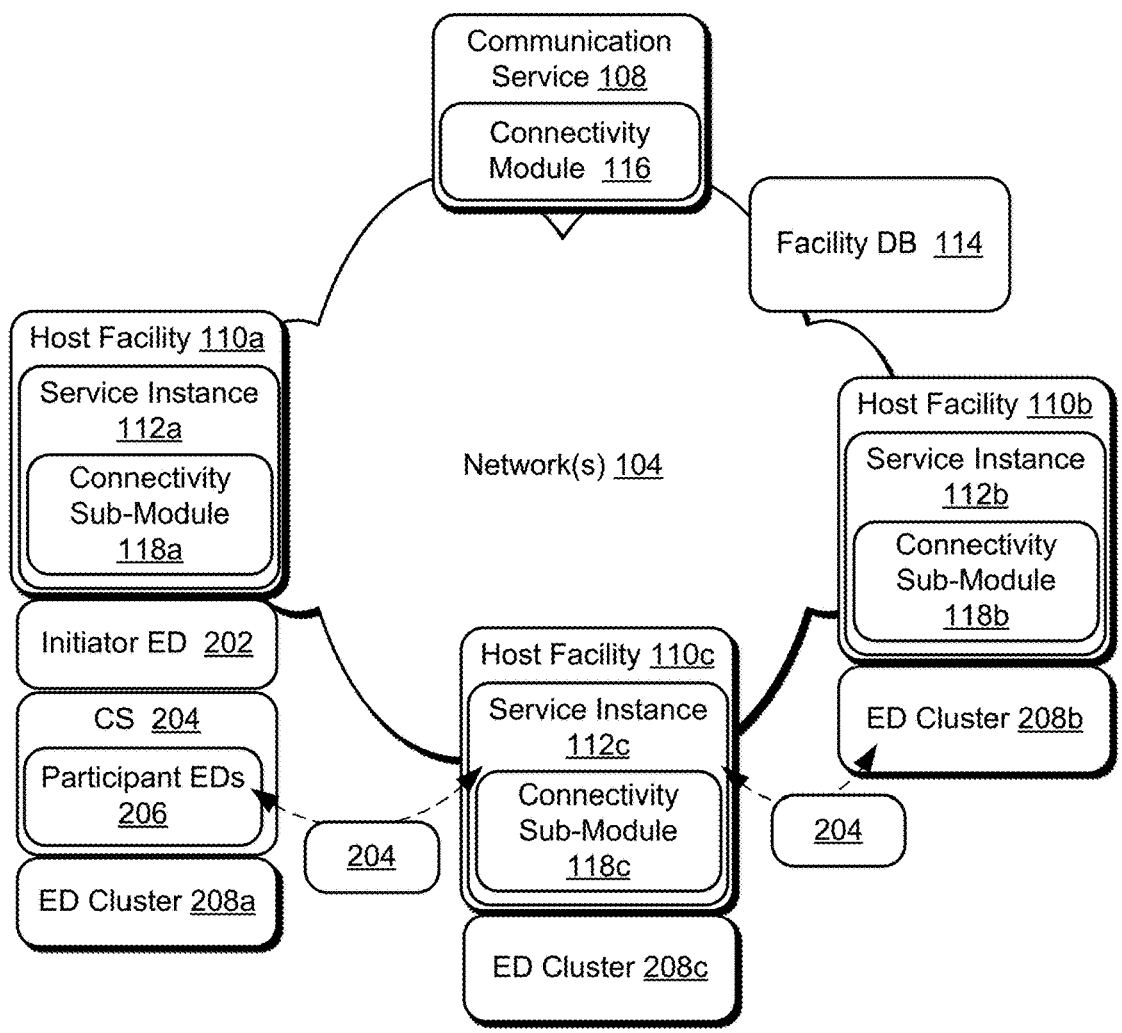
FIG. 2 illustrates an example implementation scenario for selecting a host facility for a conferencing session in accordance with one or more embodiments.

FIG. 2 illustrates an example implementation scenario 200 for selecting a host facility for a conferencing session in accordance with one or more implementations. The scenario 200 includes a host facility 110a, a host facility 110b, and a host facility 110c. Generally, the host facilities 110a-110c represent different instances of the host facilities 110. The host facilities 110a-110c are distributed over different respective locations, such as different geographic locations and/or different networks.

As illustrated, the host facility 110a includes a service instance 112a which includes a connectivity sub-module 118a, the host facility 110b includes a service instance 112b which includes a connectivity sub-module 118b, and the host facility 110c includes a service instance 112c which includes a connectivity sub-module 118c. The service instances 112a-112c generally represent different instances of the service instances 112, and the connectivity sub-modules 118a-118c represent different instances of the connectivity sub-modules 118.

Further to the scenario 200, a user of an initiator endpoint device (ED) 202 performs an action to cause a conferencing session (CS) 204 to be initiated. The user further specifies a group of participant endpoint devices (EDs) 206 to be invited to participate in the CS 204. Generally, the initiator ED 202 and the participant EDs 206 represent different instances of the endpoint devices 102. The user, for instance, creates a meeting event (e.g., an online conferencing event) associated with a particular date and time and that includes the CS 204. Alternatively or additionally, the user provides input to the initiator ED 202 to directly initiate the CS 204, such as by dialing phone numbers for the participant EDs 206, selecting contact indicia for the participant EDs, and so forth.

According to various implementations, the service instance 112a considers various attributes of the participant EDs 206 and the host facilities 110a-110c to determine which of the host facilities 110a-110c is to host the CS 204. For instance, the host facility 110a is a default host facility for the initiator ED 202, such as based on the host facility 110a being closest to the initiator ED 202 in terms of geographic and/or network-based proximity. However, instead of simply defaulting to hosting the CS 204 at the host facility 110a, the service instance 112a performs an optimization procedure that considers various attributes of the participant EDs 206 and the host facilities 110a-110c to determine which of the host facilities 110a-110c is to host the CS 204. In at least some implementations, attributes of the host facilities 110a-110c may be received directly from the host facilities themselves, and/or from some other entity such as the facility DB 114.

In one example aspect of an optimization procedure, the connectivity sub-module 118a of the service instance 112a partitions the participant EDs 206 into different sets of participant endpoint devices based on which of the host facilities 110a-110c is estimated to provide a best conferencing performance to each of the participant EDs 206 for the CS 204. In the scenario 200, for instance, the connectivity sub-module 118a assigns an endpoint device (ED) cluster 208a to the host facility 110a, an ED cluster 208b to the host facility 110b, and an ED cluster 208c to the host facility 110c. Generally, each of the ED clusters 208a-208c includes one or more different respective instances of the participant EDs 206. The ED cluster 208a, for instance, may include only the initiator ED 202, or may also include one or more others of the participant EDs 206.

According to various implementations, the ED cluster 208b is assigned to the host facility 110b based on a determination that the host facility 110b is estimated to provide a best media quality (e.g., conferencing quality) to the ED cluster 208b for the CS 204. A similar consideration is given to assigning the ED cluster 208c to the host facility 110c, and the ED cluster 208a to the host facility 110a. Example ways of assigning an endpoint to a host facility are discussed in more detail below.

Continuing with the scenario 200 and in another example aspect of an optimization procedure for the CS 204, the connectivity sub-module 118a considers the ED clusters 208a-208c to calculate a quality centroid (i.e., a "center of quality") that specifies which of the host facilities 110a-110c is to host the CS 204. Generally, calculating the quality centroid considers various attributes of the host facilities 110a-110c, the ED clusters 208a-208c, and/or the CS 204. For instance, the connectivity sub-module 118a assigns a weighting value to each endpoint device in each of the ED clusters 208a-208c and adds the weighting values for each of the endpoint devices for each respective ED cluster 208a-Qc. Different ways and considerations for weighting endpoint devices are discussed below. According to various implementations, the host facility associated with the ED cluster with the highest average and/or aggregate weighting value is determined to be a quality centroid for the CS 204 and is thus designated as the host facility for the CS 204.

In an additional or alternative implementation, the connectivity sub-module 118a estimates for each of the host facilities 110a-110c an average packet delay that will be experienced by each of the ED clusters 208a-208c if the CS 204 is hosted at the respective host facilities 110a-110c. The host facility with the lowest average packet delay can then be chosen as the host facility for the CS 204. Generally, packet delay can be estimated in various ways, such as based on historic and/or current (e.g., real-time) performance attributes for each of the host facilities 110a-110c. Performance attributes may be estimated in various ways, such as by querying the facility DB 114 for performance attributes of each of the host facilities 110a-110c.

Alternatively or additionally, the connectivity sub-module 118a may initiate a diagnostic test with each of the host facilities 110a-110c to determine a current media quality across the individual host facilities. In one particular example, a diagnostic test involves transmitting data to a particular host facility and which instructs the host facility to return a response to the test data. Based on the response, the connectivity sub-module 118a can determine various media quality attributes for a media stream across the particular host facility, such as based on packet delay, jitter rate, packet loss, packet return time, and so forth.

Continuing with the scenario 200, the host facility 110c is selected as the quality centroid for the CS 204, and thus is designated to host the CS 204. Accordingly, the host facility 110a performs hosting actions for the CS 204, examples of which are detailed throughout this discussion.

In at least some implementations, designation of the host facility 110c to host the CS 204 is performed prior to initiation of the CS 204. For instance, when the CS 204 is part of a pre-scheduled event (e.g., on an online calendar), the connectivity sub-module 118a can perform the actions described herein to select a host facility prior to the time indicated for the schedule event. For example, N minutes prior to the scheduled event, the connectivity sub-module 118a can perform the various actions to select the host facility.

Alternatively or additionally, a host facility can be selected after initiation of the CS 204. For instance, consider that the host facility 110a is initially used as a default host facility for the CS 204. After the CS 204 is initiated with the host facility 110a hosting, techniques for host selection for a media flow described herein are used to determine if the host facility 110a is to remain hosting the CS 204, or if the CS 204 is to be handed off to a different host facility. In this particular scenario where the host facility 110c is determined to be a quality centroid, the CS 204 would be handed off from the host facility 110a to the host facility 110c. Thus, the host facility 110c would take over hosting functionalities from the host facility 110a.

According to various implementations, assignment of a host facility for a conferencing session is a fluid process that can be performed dynamically and/or periodically in response to various events. For instance, consider the following scenario.

Figure 3:
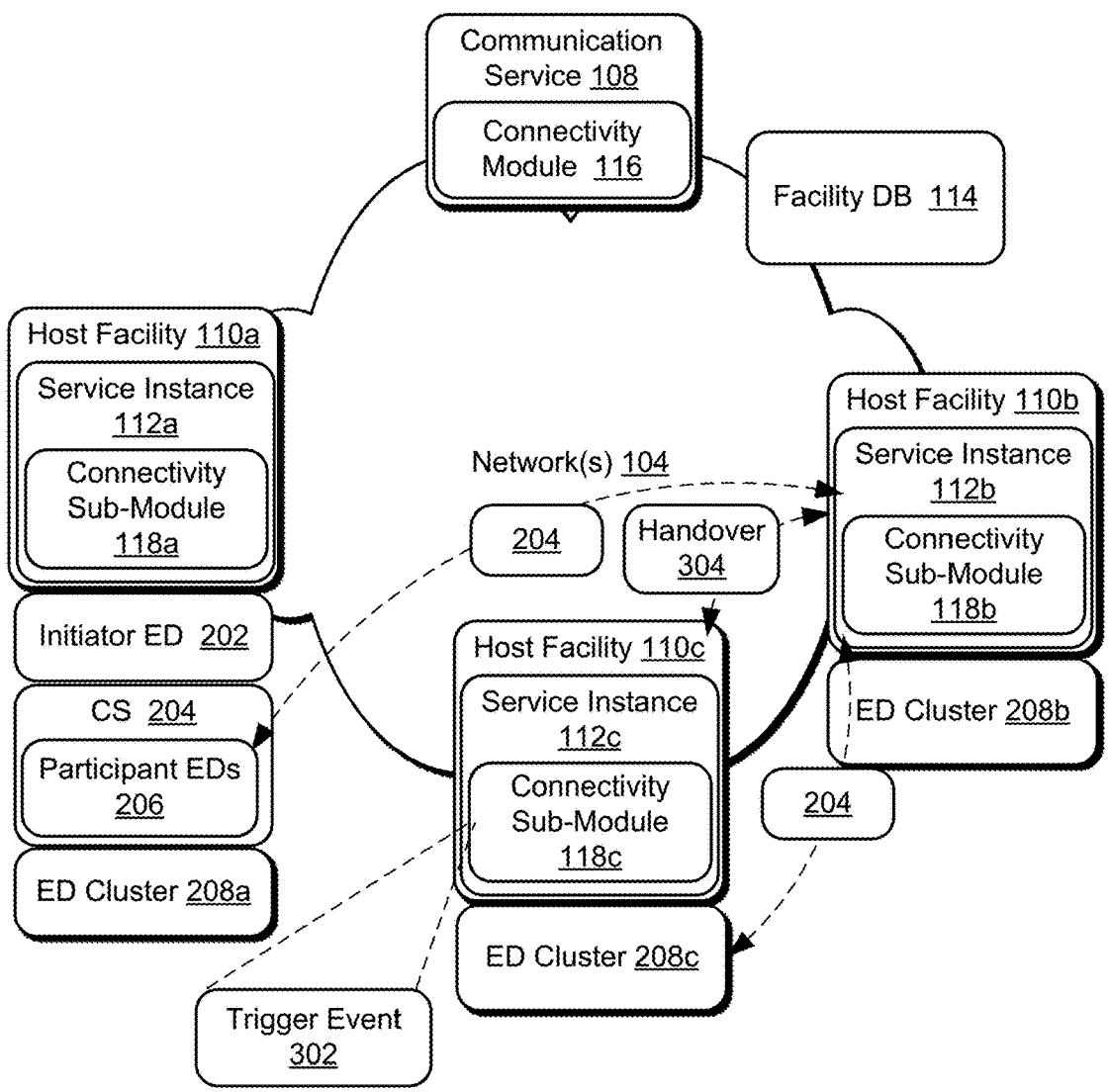
FIG. 3 illustrates an example implementation scenario for performing a host facility reassignment in accordance with one or more embodiments.

FIG. 3 illustrates an example implementation scenario 300 for performing a host facility reassignment in accordance with one or more implementations. The scenario 300 includes the various entities discussed above with reference to the scenario 200. In at least some implementations, the scenario 300 represents an extension of the scenario 200.

In the scenario 300, the host facility 110c is hosting the CS 204, such as described above. However, a trigger event 302 occurs that causes a new host facility to be assigned. Generally, the trigger event 302 causes a quality centroid for the CS 204 to be calculated and while the CS 204 is in progress. Examples of the trigger event 302 include a periodically-scheduled event that causes a quality centroid to be calculated (e.g., every N minutes), a new endpoint device joining the CS 204, an endpoint device leaving the CS 204, a change in signal quality and/or media quality at a particular host facility, a change in resource availability at a host facility, and so forth. In at least some implementations, the trigger event 302 is detected directly or indirectly by the connectivity sub-module 118c, such as based on detection of a change in the CS 204 and/or based on a notification received from one of the service instances 112a, 112b, and/or from the communication service 108.

In response to the trigger event 302, the connectivity sub-module 118c calculates (i.e., recalculates) a quality centroid for the CS 204. Example ways of calculating a quality centroid are detailed elsewhere herein. Generally, different changes pertaining to the CS 204 can cause changes in the quality centroid for the CS 204. In this particular example scenario, the host facility 110b is determined to be closest to the quality centroid, and thus the host facility 110b is assigned (i.e., reassigned) as the host facility for the CS 204. Thus, a handover 304 of hosting of the CS 204 is performed. For instance, hosting functionalities are transferred from the host facility 110c to the host facility 110b and the host facility 110b serves as a host for the CS 204.

According to at least some implementations, aspects of the scenarios 200, 300 are performed dynamically during various stages of a conferencing session, such as at scheduling time (e.g., prior to start of a conferencing session), during session initiation, while a session is in progress, and so forth. Thus, a hosting facility can be assigned and reassigned dynamically to account for various events that occur that affect a conferencing session.

While the scenarios described above are discussed with reference to particular actions taken by a particular connectivity sub-module, it is to be appreciated that similar and/or identical actions may be performed by others of the connectivity sub-modules 118a-118c, by the connectivity module 116 of the communication service 108, and/or via interaction between these various entities.

According to one or more implementations, the facility DB 114 tracks a session quality for the CS 204 as hosted by the different host facilities. For instance, one or more of the service instances 112a-112c detects a media quality experienced as part of the CS 204 and communicates media quality information to the facility DB 114. Examples of media quality information include quality information for a media stream, such as packet errors, jitter, packet delay, and so forth, detected as part of communication of a media stream. Generally, a media stream represents a flow of media data, such as voice data, video data, content data, and/or combinations thereof. Thus, indicators of the media quality can be tracked by the facility DB 114 for each of the host facilities 110a-110c to determine a relative quality of experience for each of the host facilities. Information from the facility DB 114 can be used for various purposes, such as for assigning individual endpoint devices to a host facility, for determining which host facility is to host a particular conferencing session, for enabling the individual host facilities to perform diagnostics and optimization, and so forth.

Having discussed some example implementation scenarios, consider now a discussion of some example procedures in accordance with one or more embodiments.

Example Procedures

The following discussion describes some example procedures for host selection for a media flow in accordance with one or more embodiments. The example procedures may be employed in the environment 100 of FIG. 1, the system 1000 of FIG. 10, and/or any other suitable environment. The procedures, for instance, represent procedures for implementing the example implementation scenarios discussed above. In at least some embodiments, the steps described for the various procedures can be implemented automatically and independent of user interaction. The procedures are discussed with reference to actions performed by a conferencing functionality, which represents an entity involved in various aspects of a conferencing session. Examples of a conferencing functionality include an instance of the connectivity sub-modules 118, the connectivity module 116, interactions between these modules, and so forth. This is not intended to be limiting, however, and aspects of the methods may be performed by any suitable entity.

Figure 4:
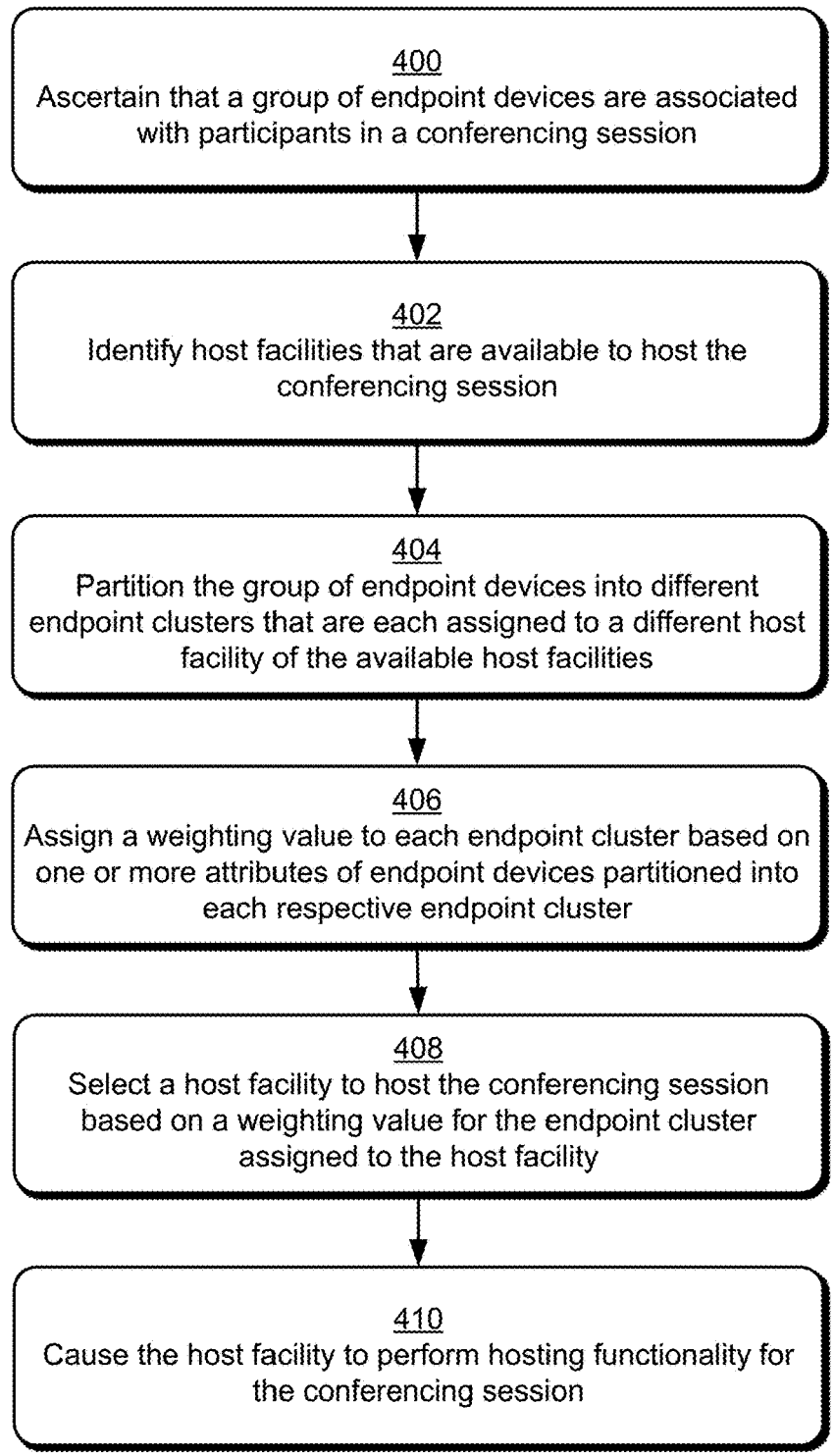
FIG. 4 is a flow diagram that describes steps in a method for determining a host facility for hosting a conferencing session in accordance with one or more embodiments.

FIG. 4 is a flow diagram that describes steps in a method in accordance with one or more embodiments. The method describes an example procedure for determining a host facility for hosting a conferencing session in accordance with one or more implementations.

Step 400 ascertains that a group of endpoint devices are associated with participants in a conferencing session. A conferencing functionality, for instance, ascertains that a conferencing session is scheduled as part of an upcoming calendar event and that the conferencing session involves multiple users associated with different endpoint devices. In another implementation, the conferencing functionality detects that a conferencing session that involves multiple different endpoint devices has started.

As discussed above, the conferencing session may be initiated by a particular user associated with an initiator endpoint device. The user, for instance, may schedule the conferencing session and invite multiple users to participate in the conferencing session. Alternatively or additionally, the user may initiate the conferencing session by dialing multiple users to invite the users to participate in the conferencing session.

Step 402 identifies host facilities that are available to host the conferencing session. A conferencing functionality, for example, determines that a certain discrete set of host facilities (e.g., data centers) are available to host the conferencing session. For example, with reference to conferencing sessions implemented via the communication service 108, the conferencing functionality identifies a set of host facilities on which instances of the service instances 112 are deployed as host facilities that are available to host the conferencing session. Alternatively or additionally, host facilities that are within a certain geographic and/or network-based proximity to endpoint devices of the group of endpoint devices are identified as host facilities that are available to host the conferencing session.

Step 404 partitions the group of endpoint devices into different endpoint clusters that are each assigned to a different host facility of the available host facilities. For instance, a conferencing functionality assigns the individual endpoint devices to a respective available host facility based on a quality metric for each endpoint device relative to each host facility of the available host facilities. Placing a particular endpoint device into a particular cluster for a host facility, for example, is based on a determination that the host facility is estimated to provide a best conferencing experience to the particular endpoint device, such as based on media quality across the host facility. One example way of assigning an endpoint device to a host facility is described below. Generally, each cluster includes a different set of endpoint devices from the group of endpoint devices.

Step 406 assigns a weighting value to each endpoint cluster based on one or more attributes of endpoint devices partitioned into each respective endpoint cluster. Generally, a weighting value for a particular endpoint cluster can be assigned in various ways, such as based on attributes of endpoints partitioned into the cluster, attributes of the endpoint cluster relative to the conferencing session, attributes of a host facility to which the endpoint cluster is assigned, and so forth. One example way of assigning a weighting value to an endpoint cluster is described below. Generally, at least some of the endpoint clusters will be assigned different respective weighting values.

Step 408 selects a host facility to host the conferencing session based on a weighting value for the endpoint cluster assigned to the host facility. For instance, a host facility associated with an endpoint cluster with the highest aggregate weighting value is selected to host the conferencing session.

Step 410 causes the host facility to perform hosting functionality for the conferencing session. As discussed above, the host facility selected to host the conferencing session may be different than a host facility associated with an endpoint device used to initiate the communication session. Thus, causing the selected host facility to perform hosting functionality may include handing over the conferencing session from a default hosting functionality to the selected hosting functionality. Such a handover may occur prior to start of the conferencing session, after the conferencing session is in progress, and so forth.

Generally, causing the selected host facility to perform hosting functionality may be initiated in various ways, such as via a notification to the selected host facility that identifies the conferencing session (e.g., via a conference identifier) and that instructs the host facility to perform hosting tasks for the conferencing session, examples of which are discussed throughout.

Figure 5:
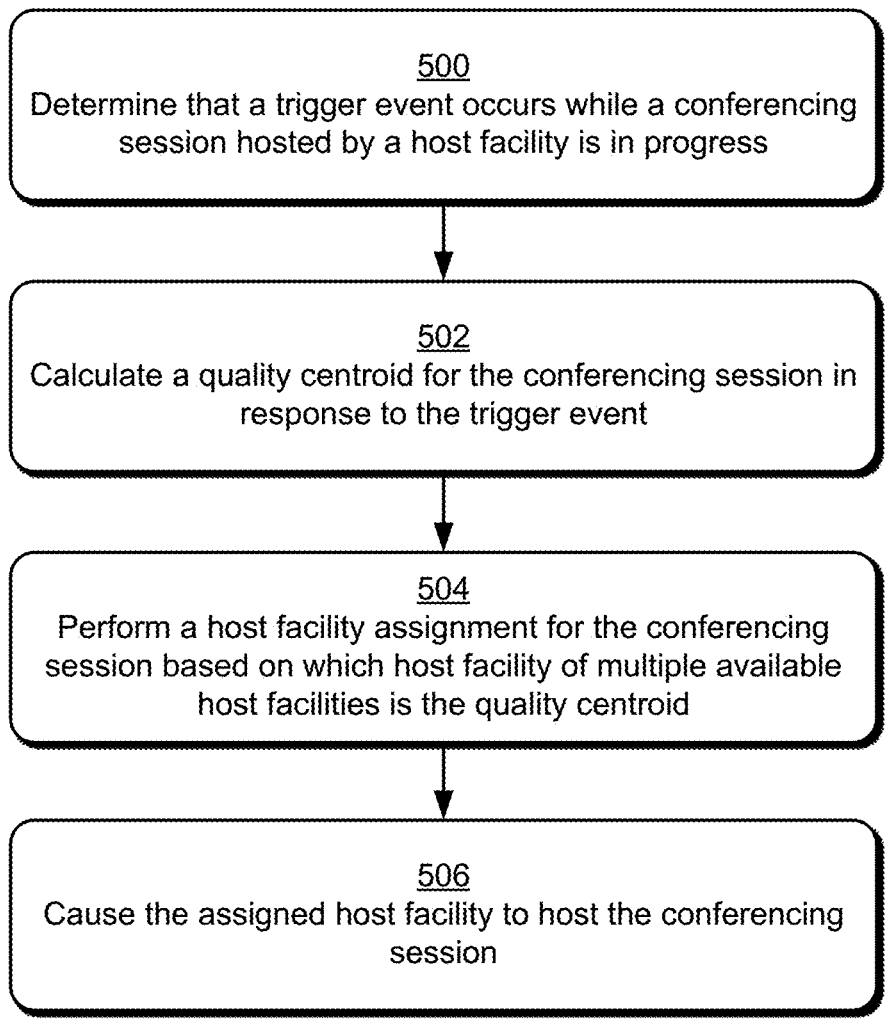
FIG. 5 is a flow diagram that describes steps in a method for assigning a host facility for hosting a conferencing session in accordance with one or more embodiments.

FIG. 5 is a flow diagram that describes steps in a method in accordance with one or more embodiments. The method describes an example procedure for assigning a host facility for hosting a conferencing session in response to a trigger event in accordance with one or more implementations. Generally, the procedure is performed after a conferencing session is initiated, such as described above with reference to FIG. 4.

Step 500 determines that a trigger event occurs while a conferencing session hosted by a host facility is in progress. The conferencing session, for instance, is currently hosted by a host facility assigned according to the procedure described above with reference to FIG. 4.

The trigger event generally represents an event that causes a host facility assignment procedure to be initiated. In at least some implementations, different trigger events a predefined and are detectable by various conferencing functionalities involved in a conferencing session.

Examples of different trigger events include:

Periodic Quality Check—after initiation of a conferencing session, a host facility assignment procedure can be periodically performed to ensure that the conferencing session is providing an optimal conferencing experience to endpoint devices involved in the session. The periodic quality check, for instance, can be performed every N minutes.

Change in Number of Participant Devices—a change in a number of participant devices can initiate a trigger event. The change can include an endpoint device disconnecting from a conferencing session and/or a new endpoint device joining the conferencing session. Generally, the change can cause a change in a number of devices present in an endpoint cluster, which can affect calculation of a quality centroid for the conferencing session.

Change in Type of Participant Device—a change in a device type for a conference participant can initiate a trigger event. For instance, a mobile user in transit may initially connect to a conferencing session using a mobile phone. However, after arriving at a particular location, the mobile user may change their connection to a different endpoint device, such as a desktop computer. Such a change in endpoint device type can cause various changes that affect calculating a quality centroid, such as a network type used for connectivity to the conferencing session, a change in device capabilities, a change in endpoint device capabilities, and so forth.

Change in Current Host Facility—a change in a current host facility can initiate a trigger event. For instance, conditions at a current host facility can change in response to various events, such as an increase or decrease in network load (e.g., a change in available bandwidth), a malfunction in facility hardware, a power loss, and so forth.

These particular trigger events are presented for purpose of example only, and techniques for host selection for a media flow may recognize a wide variety of different trigger events not expressly mentioned herein.

Step 502 calculates a quality centroid for the conferencing session in response to the trigger event. Generally, a quality centroid represents a virtual network location that if used to host a conferencing session, would satisfy various quality-related policies for the conferencing session. Quality policies can be defined to consider a variety of different session-related attributes, such as overall media quality for a conferencing session, user type, device type, network type, and so forth. For instance, one quality policy specifies that a quality centroid is a network location that is predicted to provide an optimal media quality to participants in the communication session. An example way of calculating a quality centroid is described below.

Step 504 performs a host facility assignment for the conferencing session based on which host facility of multiple available host facilities is the quality centroid. A conferencing functionality, for example, determines that a certain discrete set of host facilities (e.g., data centers) are available to host the conferencing session. Example ways of identifying candidate host facilities are described above. The conferencing functionality then assigns a host facility that is closest to the quality centroid as the host facility for the conferencing session.

Step 506 causes the assigned host facility to host the conferencing session. In at least some implementations, performing the host facility assignment causes a new host facility to be designated. Thus, a handover of the conferencing session from the current host facility to the new host facility is performed. Alternatively, the current host facility may be determined to be closest to the quality centroid, and thus the current host facility is assigned to host the conferencing session. Thus, the conferencing session remains hosted by the current host facility. Examples of different hosting functionalities performed by a host facility are discussed above.

In at least some implementations, a reassignment timer can be implemented that limits a frequency of host facility reassignment. For instance, consider the following example procedure.

Figure 6:
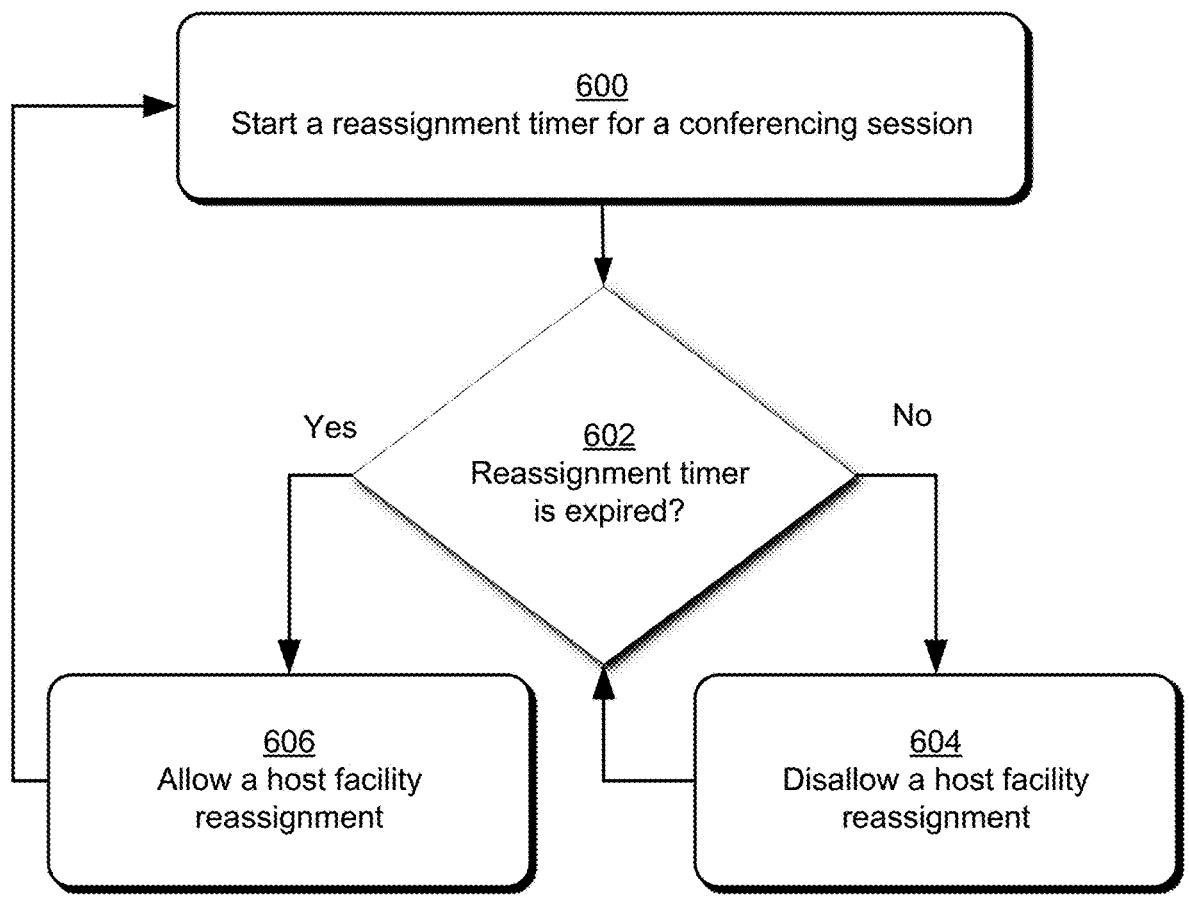
FIG. 6 is a flow diagram that describes steps in a method for limiting a frequency of host facility reassignment for a conferencing session in accordance with one or more embodiments.

FIG. 6 is a flow diagram that describes steps in a method in accordance with one or more embodiments. The method describes an example procedure for limiting a frequency of host facility reassignment for a conferencing session in accordance with one or more implementations. Generally, the procedure is performed after a conferencing session is initiated, such as described above with reference to FIG. 4. Further, the procedure may be performed in conjunction with the host facility assignment procedure described above with reference to FIG. 5. For instance, the procedure may be performed between steps 504 and 506 of FIG. 5.

Step 600 starts a reassignment timer for a conferencing session. Generally, the reassignment timer can be started in response to various events, such as an initiation of the conferencing session, occurrence of a host facility reassignment, and so forth. A reassignment timer can correspond to any suitable time period, such as x seconds, y minutes, and so forth.

Step 602 determines whether the reassignment timer is expired. If the reassignment timer is not expired ("No"), step 604 disallows a host facility reassignment. The procedure then returns to step 602.

If the reassignment timer is expired ("Yes"), step 606 allows a host facility reassignment. For instance, if a new host facility for the communication session has been assigned (e.g., as described above), a conferencing functionality allows hosting of the conferencing session to be handed over to the new host facility. The procedure then returns to step 600 to restart the reassignment timer.

Generally, using a timer or other method for limiting a frequency of host facility reassignment prevents disruptions in conferencing session quality of experience that may occur due to excessively frequency host facility handovers.

Figure 7:
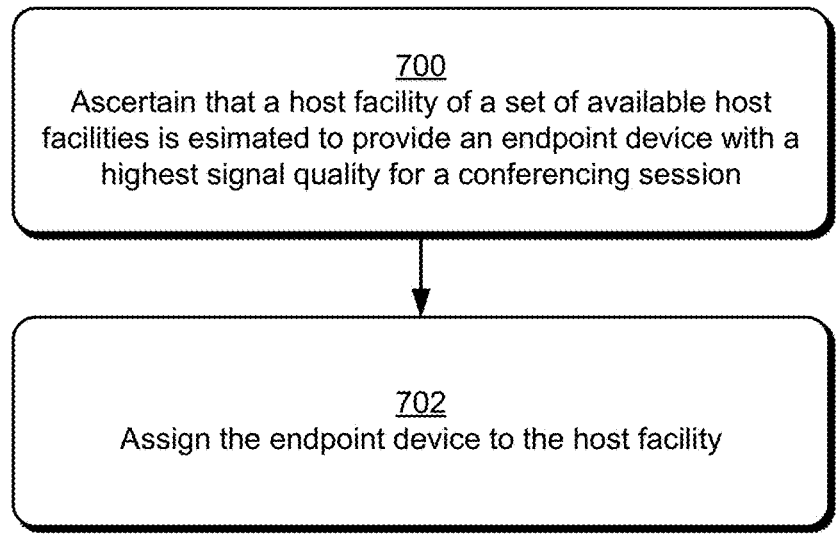
FIG. 7 is a flow diagram that describes steps in a method for assigning an endpoint device to a host facility in accordance with one or more embodiments.

FIG. 7 is a flow diagram that describes steps in a method in accordance with one or more embodiments. The method describes an example procedure for assigning an endpoint device to a host facility in accordance with one or more implementations. The procedure, for instance, represents an example way of performing step 404 of FIG. 4.

Step 700 ascertains that a host facility of a set of available host facilities is estimated to provide an endpoint device with a highest media quality for a conferencing session. A conferencing functionality, for instance, compares a location of the endpoint device to the set of available host facilities to determine which of the host facilities is predicted to provide the endpoint device with a highest media quality for a media flow that involves the endpoint device. Location may be specified in various ways, such as geographical location, network location, and so forth. In at least some implementations, a host facility that represents the least number of network hops between the endpoint device and the host facility can be selected. Various other facility attributes can be considered, such as historic and/or current media quality across the different host facilities, bandwidth and/or processing resources at the respective host facilities, and so forth.

Media quality at individual host facilities can be characterized based on various attributes, such as lowest average packet delay and/or packet errors, highest average bandwidth, user data indicating relative user satisfaction with session quality, and so forth. For instance, a host facility that is predicted to provide the endpoint device with a lowest average packet delay for a media stream of the conferencing session is selected for the endpoint device.

Step 702 assigns the endpoint device to the host facility. The endpoint device, for instance, is placed into an endpoint cluster that is assigned to the host facility.

Figure 8:
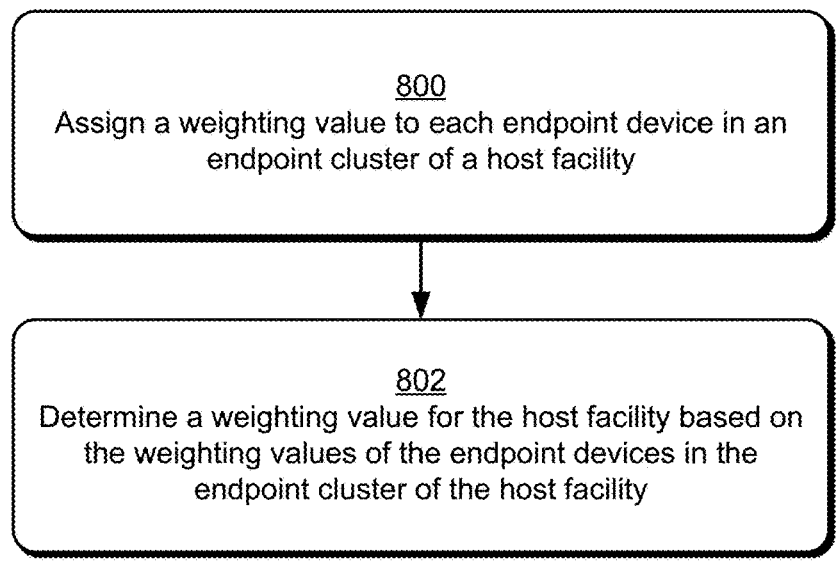
FIG. 8 is a flow diagram that describes steps in a method for assigning a weighting value to a host facility in accordance with one or more embodiments.

FIG. 8 is a flow diagram that describes steps in a method in accordance with one or more embodiments. The method describes an example procedure for assigning a weighting value to a host facility in accordance with one or more implementations. The procedure, for instance, represents an example way of performing step 406 of FIG. 4.

Step 800 assigns a weighting value to each endpoint device in an endpoint cluster of a host facility. The endpoint cluster, for instance, represents a set of endpoint devices that are assigned to the host facility. Example ways of partitioning endpoint devices into endpoint clusters for different host facilities are detailed elsewhere herein.

A weighting value may be assigned to an endpoint device based on various attributes of the endpoint device, such as:

Device Type—different device types may be weighted higher or lower than other device types. For instance, a wireless device using a wireless connection may be weighted higher than an endpoint device using a wired network connection. Weighting a wireless device higher may skew host facility assignment toward a host facility associated with the wireless device to reduce any latency or other quality issues that may be introduced due to a wireless connection.

Network Type—a network to which an endpoint device is connected can be considered in assigning a weighting value to an endpoint device. For instance, a wireless cellular network may be weighted higher than a wired corporate network, such as to reduce latency that may be introduced by wireless data connectivity.

User Ranking—user ranking in an organization may be considered in assigning a weighting value to an endpoint device. For instance, an endpoint device of a higher ranking user (e.g., a chief executive officer (CEO)) may be given a higher weighting value than an endpoint device of a lower ranking user.

User Role—user role in a conferencing session may be considered. For instance, endpoint device of an organizer (e.g., an initiator) and/or presenter may weighted higher than an endpoint device of a standard participant.

These attributes are presented for purpose of example only, and any suitable attribute and/or collection of attributes may be considered in assigning a weighting value to an endpoint device. For instance, an individual attribute may be considered, or a set of attributes may be considered. Types and instances of attributes that are considered may be configurable, such as by a network administrator or other personnel associated with a conferencing session.

Step 802 determines a weighting value for the host facility based on the weighting values of the endpoint devices in the endpoint cluster of the host facility. For instance, the weighting values of the endpoint devices are averaged to find an average weighting value for cluster. The average weighting value can be designated as the weighting value for the host facility. Various other mathematical operations and/or algorithms may additionally or alternatively be applied to the endpoint weighting values to determine the host facility weighting value.

Figure 9:
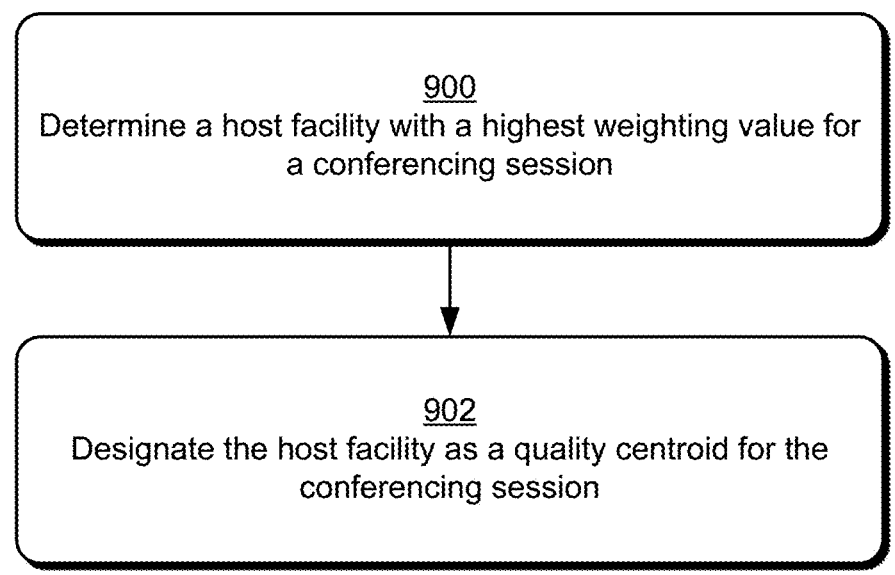
FIG. 9 is a flow diagram that describes steps in a method for calculating a quality centroid in accordance with one or more embodiments.

FIG. 9 is a flow diagram that describes steps in a method in accordance with one or more embodiments. The method describes an example procedure for calculating a quality centroid in accordance with one or more implementations. The procedure, for instance, represents an example way of performing step 502 of FIG. 5.

Step 900 determines a host facility with a highest weighting value for a conferencing session. One example way of determining weighting values for host facilities is discussed above.

Step 902 designates the host facility as a quality centroid for the conferencing session. The host facility, for instance, is determined to satisfy certain quality-related criteria for the conferencing session, such as based on the host facility having a highest weighting value within a set of host facilities available to host the conferencing session. As discussed above, the host facility can be assigned and/or reassigned as a host facility for the conferencing session based on the host facility being designated a quality centroid for the conferencing session.

Accordingly, techniques for host selection for a media flow described herein enable hosting duties for a conferencing session to be assigned and reassigned to different host facilities based on a variety of different criteria. This ability to dynamically assign hosting duties enables optimization of conferencing session performance, such as in response to various events that may occur prior to and/or after initiation of a conferencing session.

Having discussed some example procedures, consider now a discussion of an example system and device in accordance with one or more embodiments.

Example System and Device

Figure 10:
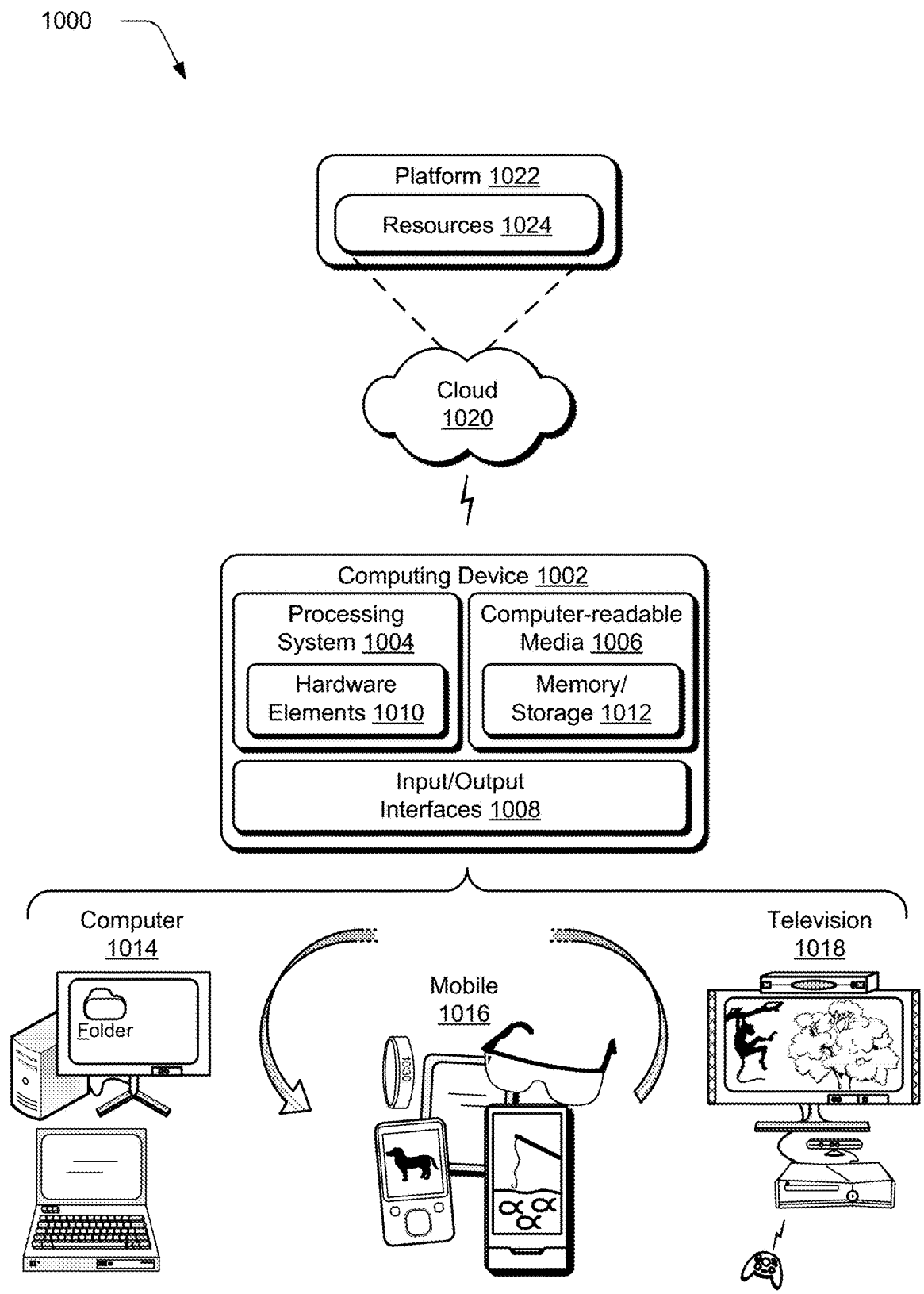
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, an endpoint device 102 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, wearable devices, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the entities of the environment 100 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for selecting a host facility for a conferencing session, the system including: one or more processors; and one or more computer-readable storage media including instructions stored thereon that, responsive to execution by the one or more processors, cause the system perform operations including: ascertaining that a group of endpoint devices are associated with participants in a conferencing session; identifying host facilities that are available to host the conferencing session; partitioning the group of endpoint devices into different endpoint clusters that are each assigned to a different host facility of the available host facilities based on determining for each endpoint device which host facility of the available host facilities is estimated to provide the endpoint device with a highest media quality for a media flow; assigning a weighting value to each endpoint cluster of the different endpoint clusters based on one or more attributes of endpoint devices partitioned into each respective endpoint cluster; and selecting a host facility to host the conferencing session based on a weighting value for the endpoint cluster assigned to the host facility.

Example 2

A system as described in example 1, wherein the conferencing session is initiated by an initiator endpoint device, and wherein one or more of the host facilities that are available to host the conferencing session are located at different geographical locations than the initiator endpoint device.

Example 3

A system as described in one or more of examples 1 or 2, wherein said partitioning includes assigning a particular endpoint device to a particular endpoint cluster based on determining that a host facility associated with the endpoint cluster is estimated to provide the endpoint device with a highest media quality from among the available host facilities for the conferencing session.

Example 4

A system as described in one or more of examples 1-3, wherein said partitioning includes assigning a particular endpoint device to a particular endpoint cluster based on determining that a host facility associated with the endpoint cluster is estimated to provide the endpoint device with a lowest average packet delay from among the available host facilities for the conferencing session.

Example 5

A system as described in one or more of examples 1-4, wherein said assigning a weighting value to a particular endpoint cluster is based on one or more weighting values for one or more endpoint devices assigned to the particular endpoint cluster.

Example 6

A system as described in one or more of examples 1-5, wherein said assigning a weighting value to a particular endpoint cluster is based on one or more weighting values for one or more endpoint devices assigned to the particular endpoint cluster, and wherein the one or more weighting values for the one or more endpoint devices are assigned based on one or more attributes of the one or more endpoint devices.

Example 7

A system as described in one or more of examples 1-6, wherein said assigning a weighting value to a particular endpoint cluster is based on one or more weighting values for one or more endpoint devices assigned to the particular endpoint cluster, and wherein the one or more weighting values for the one or more endpoint devices are assigned based on one or more of a user ranking or a user role for a user of the one or more endpoint devices.

Example 8

A system as described in one or more of examples 1-7, wherein said selecting includes the host facility with the highest average weighting value.

Example 9

A system as described in one or more of examples 1-8, wherein the conferencing session is initiated by an initiator endpoint device associated with a particular host facility, and wherein the selected host facility is different than the particular host facility.

Example 10

A system as described in one or more of examples 1-9, wherein the operations further include: determining while the conferencing session hosted by the host facility is in progress that a trigger event occurs; calculating a quality centroid for the conferencing session in response to the trigger event; and performing a host facility reassignment for the conferencing session based on which host facility of the available host facilities is closest to the quality centroid.

Example 11

A computer-implemented method for selecting a host facility for a conferencing session, the method including: identifying host facilities that are available to host a conferencing session; partitioning a group of endpoint devices associated with participants in the conferencing session into different endpoint clusters that are each assigned to a different host facility of the available host facilities and based on a quality metric for each endpoint device relative to each host facility of the available host facilities; assigning a weighting value to each endpoint cluster based on one or more attributes of endpoint devices partitioned into each endpoint cluster; and selecting a host facility to host the conferencing session based on a weighting value for the endpoint cluster assigned to the host facility.

Example 12

A method as described in example 11, wherein the conferencing session is initiated by an initiator endpoint device associated with a particular host facility, the selected host facility is different than the particular host facility, and wherein the method further includes causing the selected host facility to host the conferencing session instead of the particular host facility.

Example 13

A method as described in one or more of examples 11 or 12, wherein the conferencing session is scheduled by an initiator endpoint device associated with a particular host facility, the selected host facility is different than the particular host facility, and wherein the method further includes causing the selected host facility to initiate hosting of the conferencing session.

Example 14

A method as described in one or more of examples 11-13, wherein the conferencing session is scheduled by an initiator endpoint device associated with a particular host facility, the selected host facility is different than the particular host facility, and wherein the method further includes causing a handover of hosting of the conferencing session from the particular host facility to the selected host facility.

Example 15

A method as described in one or more of examples 11-14, further including: determining while the conferencing session hosted by the host facility is in progress that a trigger event occurs; calculating a quality centroid for the conferencing session in response to the trigger event; and performing a host facility reassignment for the conferencing session based on which host facility of the available host facilities is closest to the quality centroid.

Example 16

A computer-implemented method for assigning a host facility for a conferencing session, the method including: determining while a conferencing session hosted by a host facility is in progress that a trigger event occurs; calculating a quality centroid for the conferencing session in response to the trigger event; and performing a host facility assignment for the conferencing session based on which host facility of multiple available host facilities is the quality centroid.

Example 17

A method as described in example 16, wherein the trigger event includes one or more of: a periodic quality check during the conferencing session; a change in a number of participant devices in the communication session; a change in a device type for an endpoint device participating in the communication session; or a change in the current host facility.

Example 18

A method as described in one or more of examples 16 or 17, wherein said calculating the quality centroid includes determining a particular host facility with a highest weighting value of multiple available host facilities, and designating the particular host facility as the quality centroid.

Example 19

A method as described in one or more of examples 16-18, wherein said performing includes assigning a different host facility for hosting the conferencing session, and causing a hosting handover from the host facility to the different host facility.

Example 20

A method as described in one or more of examples 16-19, further including waiting for a reassignment timer to expire before performing the host facility reassignment.

CONCLUSION

Techniques for host facility assignment for a media flow are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system configured to select a hosting facility to host a communication session for a group of devices comprising:
   one or more processors; and
   one or more computer-readable storage devices including instructions stored thereon that, responsive to execution by the one or more processors, cause the system perform operations including:
   partitioning the devices into multiple clusters, wherein each cluster is associated with a respective host facility that is estimated to provide each device in the respective cluster a specified quality requirement during the communication session;
   accessing a weighting value for each cluster of the different clusters based on one or more attributes of the devices in each respective cluster of the different clusters; and
   selecting a group host facility from the host facilities associated with the clusters based on the weighting value of each respective cluster and a predefined criterion, the group host facility to host the communication session for the devices.

2. A system as described in claim 1, wherein the communication session is initiated by an initiator device, and wherein one or more of the host facilities that are available to host the conferencing session are located at different geographical locations than the initiator device.

3. The system of claim 1, wherein the partitioning comprises:
   determining an estimate of media quality provided by each of a plurality of host facilities to a particular device;
   determining which particular host facility of the plurality of host facilities provides the best estimated media quality based on the determined estimates; and
   assigning the particular device to a cluster associated with the particular host facility based on the determining.

4. The system of claim 1, wherein the partitioning comprises:
   determining an estimate of average packet delay provided by each of a plurality of host facilities to a particular device;
   second determining which particular host facility of the plurality of host facilities provides the lowest average packet delay based on the determined estimates; and
   assigning the particular device to a cluster associated with the particular host facility based on the second determining.

5. The system of claim 1, further comprising assigning a weight value to a particular cluster based on one or more weight values for one or more devices assigned to the particular cluster.

6. The system of claim 5, wherein the assigning of the weight value to the particular cluster is based on one or more attributes of the devices.

7. The system of claim 6, wherein the assigning of the weight value is further based on one or more of a user ranking or a user role for a user of a device assigned to the particular cluster.

8. The system of claim 1, the operations further comprising determining an average weight value for each cluster, wherein the selecting of the group host facility selects a host facility associated with a cluster having a highest average weighting value of the determined average weight values for each cluster.

9. The system of claim 1, the operations further comprising:
   determining the selected host facility is unavailable to host the communications session;
   in response to the determination, second determining a quality centroid for the communication session;
   determining a set of available host facilities based on the determination;
   determining, for each available host facility, a distance to the quality centroid;
   selecting a host facility having the shortest distance from the quality centroid as a new host facility; and
   hosting the communication session via the selected new host facility.

10. A method for selecting a hosting facility to host a communication session for a group of devices comprising:
   partitioning the devices into multiple clusters, wherein each cluster is associated with a respective host facility that is estimated to provide each device in the respective cluster a specified quality requirement during the communication session;

accessing a weighting value for each cluster of the different clusters based on one or more attributes of the devices in each respective cluster of the different clusters; and selecting a group host facility, from the host facilities associated with the clusters based on the weighting value of each respective cluster and a predefined criterion, the group host facility to host the communication session for the devices.

11. The method of claim 10, wherein the communication session is initiated by an initiator device, and wherein one or more of the host facilities that are available to host the conferencing session are located at different geographical locations than the initiator device.

12. The method of claim 10, wherein the partitioning comprises:
determining an estimate of media quality provided by each of a plurality of host facilities to a particular device;
determining which particular host facility of the plurality of host facilities provides the best estimated media quality based on the determined estimates; and
assigning the particular device to a cluster associated with the particular host facility based on the determining.

13. The method of claim 10, wherein the partitioning comprises:
determining an estimate of average packet delay provided by each of a plurality of host facilities to a particular device;
second determining which particular host facility of the plurality of host facilities provides the lowest average packet delay based on the determined estimates; and
assigning the particular device to a cluster associated with the particular host facility based on the second determining.

14. The method of claim 10, further comprising assigning a weight value to a particular cluster based on one or more weight values for one or more devices assigned to the particular cluster.

15. The method of claim 14, wherein the assigning of the weight value to the particular cluster is based on one or more attributes of the devices.

16. The method of claim 15, wherein the assigning of the weight value is further based on one or more of a user ranking or a user role for a user of a device assigned to the particular cluster.

17. The method of claim 10, further comprising determining an average weight value for each cluster, wherein the selecting of the group host facility selects a host facility associated with a cluster having a highest average weighting value of the determined average weight values for each cluster.

18. The method of claim 10, further comprising:
determining the selected host facility is unavailable to host the communications session;
in response to the determination, second determining a quality centroid for the communication session;
determining a set of available host facilities based on the determination;
determining, for each available host facility, a distance to the quality centroid;
selecting a host facility having the shortest distance from the quality centroid as a new host facility; and
hosting the communication session via the selected new host facility.

19. A non-transitory computer readable storage medium comprising instructions that when executed configure hardware processing circuitry to perform operations for selecting a hosting facility to host a communication session for a group of devices, the operations comprising:
partitioning the devices into multiple clusters, wherein each cluster is associated with a respective host facility that is estimated to provide each device in the respective cluster a specified quality requirement during the communication session;
accessing a weighting value for each cluster of the different clusters based on one or more attributes of the devices in each respective cluster of the different clusters; and
selecting a group host facility, from the host facilities associated with the clusters based on the weighting value of each respective cluster and a predefined criterion, the group host facility to host the communication session for the devices.

20. The non-transitory computer readable storage medium of claim 19, the operations further comprising:
determining the selected host facility is unavailable to host the communications session;
in response to the determination, second determining a quality centroid for the communication session;
determining a set of available host facilities based on the determination;
determining, for each available host facility, a distance to the quality centroid;
selecting a host facility having the shortest distance from the quality centroid as a new host facility; and
hosting the communication session via the selected new host facility.

* * * * *